July 11, 1933.  P. W. KANE  1,917,589
PNEUMATIC SHOCK ABSORBER
Filed Sept. 15, 1930  3 Sheets-Sheet 3
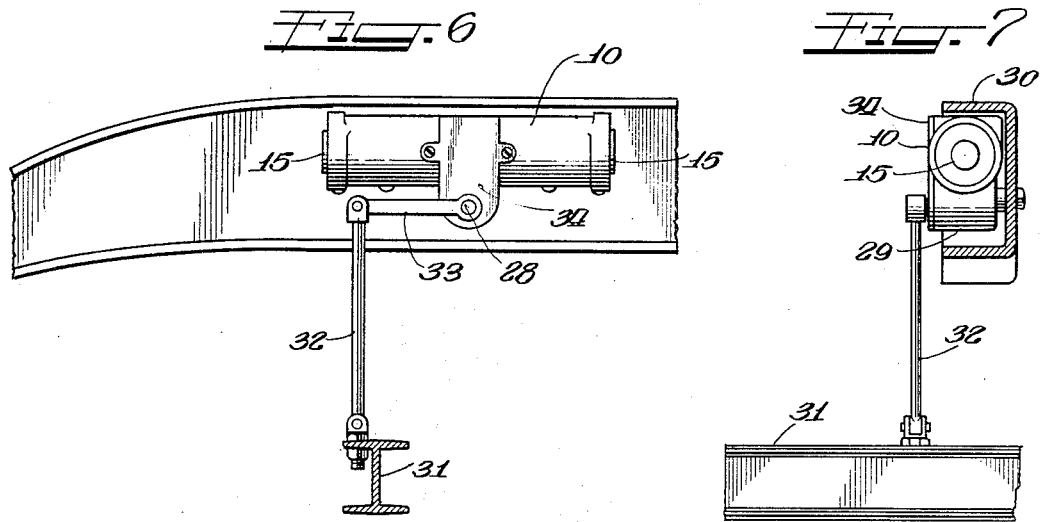
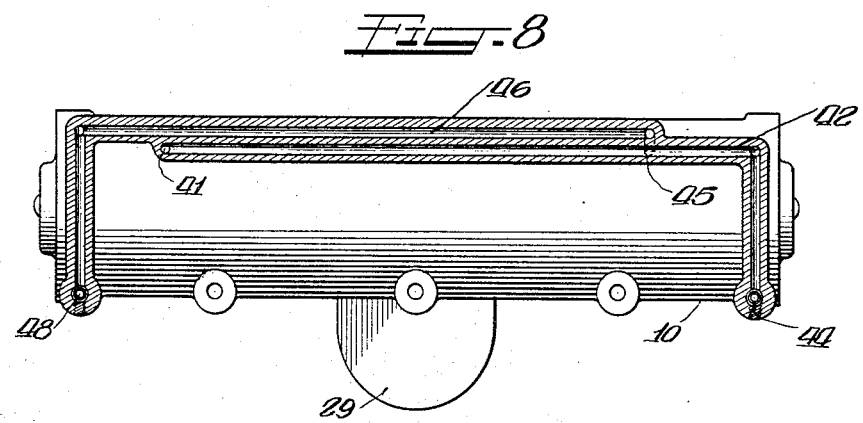

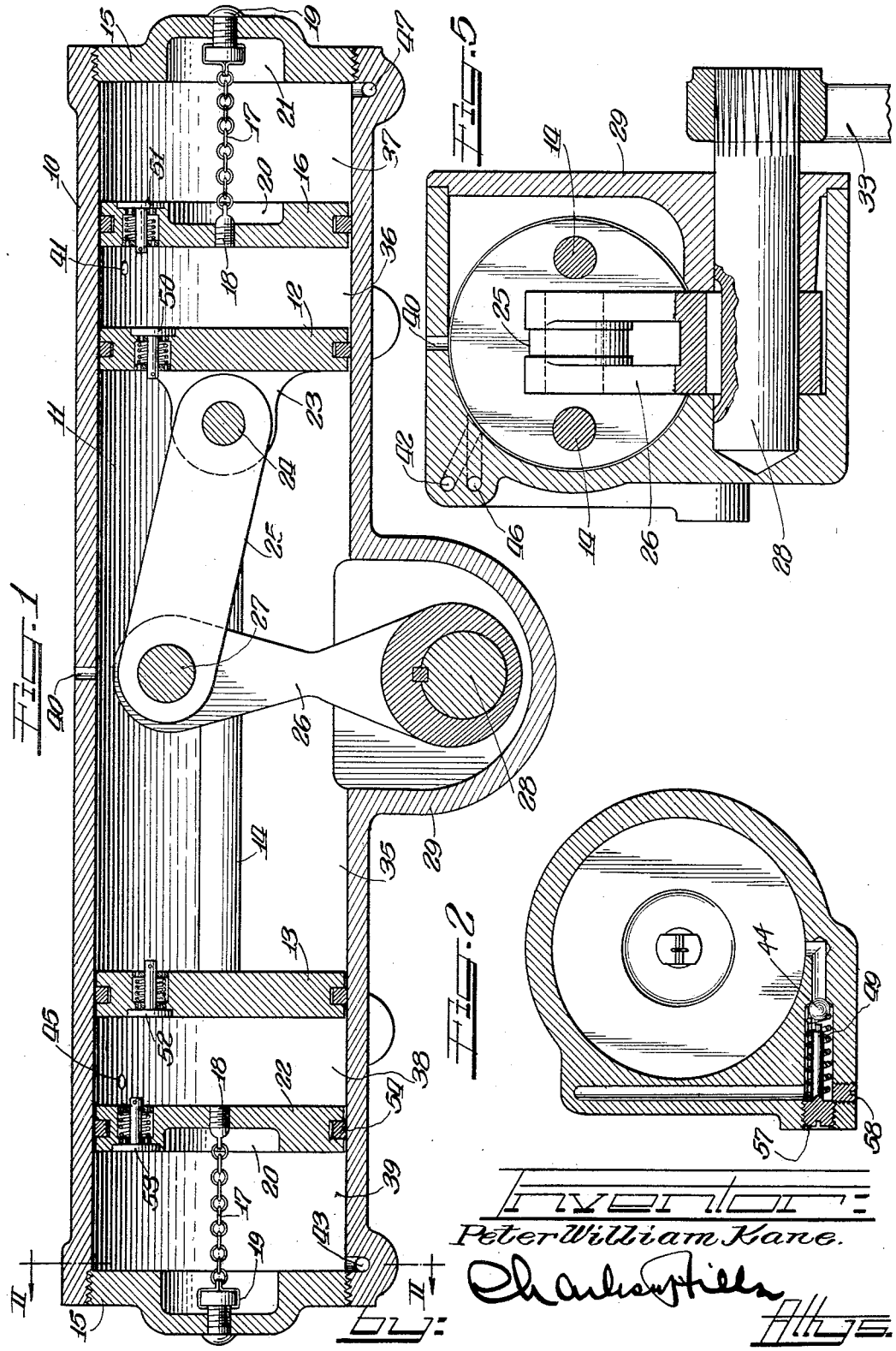

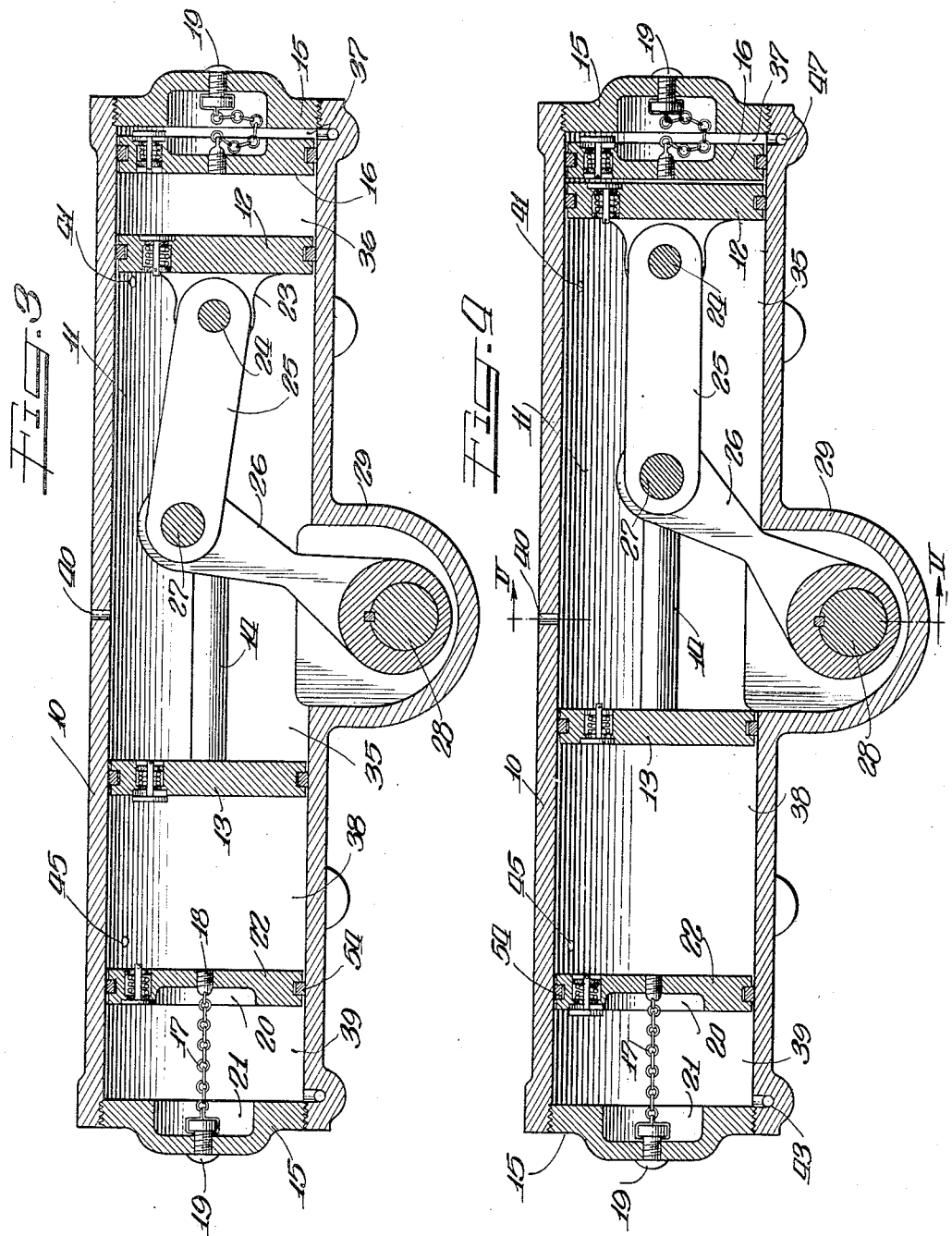

Patented July 11, 1933

1,917,589

UNITED STATES PATENT OFFICE

PETER W. KANE, OF CHICAGO, ILLINOIS

PNEUMATIC SHOCK ABSORBER

Application filed September 15, 1930. Serial No. 481,826.

My invention relates to pneumatic cushioning devices, and more particularly to a device especially designed to operate as a shock absorber on automobiles, and the like, although it is to be understood, of course, that my invention can be used in other situations where a cushioning action is required.

It is well known that when an automobile passes over a depression in the road surface, or over a hump, that the occupants of the vehicle are frequently bounced off their seats by the recoil action of the springs. One of the principal objects of my invention is to prevent this by retarding the recoil action by air cushioning means so that the body of the vehicle will gradually assume its normal position relative to the running gear of the vehicle.

It is an important object of my invention to provide means whereby the relatively movable body and axle of the vehicle are compelled to store energy by compressing air as they move initially, together or apart, as the wheel of the vehicle meets a hump or enters a depression, then to entrap the compressed air so that its energy is not available to assist the recoil of the springs, and to direct the compressed air so that its energy is made available to yieldingly check the recoil of the springs.

It is a further important object of my invention to provide a pneumatic shock absorber having a low pressure chamber, and a plurality of high pressure chambers adapted to receive and entrap compressed air, and having means to selectively direct compressed air from one high pressure chamber to another to retard the recoil of the springs of a vehicle.

It is a further important object of my invention to provide a pneumatic shock absorber having a plurality of high pressure chambers, and having means to pump air into said chambers to replenish them in the event of air having leaked therefrom, and also having means to selectively connect the high pressure chambers with the atmosphere to relieve them of air pressure above a predetermined value.

It is an important object of my invention to provide a pneumatic shock absorber which will permit relatively free initial movement of the body and axle of the vehicle in either direction with a braking action on the recoil movement of the springs when the road shocks are relatively light and infrequent, but which will automatically build up a high pressure in its pressure chambers to practically support the body of the vehicle floating on an air cushion when the road shocks are frequent.

In the drawings:—

Figure 1 is a side sectional view, with parts in elevation, of a structure embodying the principles of my invention.

Figure 2 is a sectional view along the lines II—II of Figure 1, with parts in elevation, showing the details of a valve mechanism.

Figure 3 is a side sectional view, similar to Figure 1, showing certain movable parts in an operative position different from that of Figure 1.

Figure 4 is another side sectional view, similar to Figure 1, and showing certain movable parts in another operative position.

Figure 5 is a sectional view, with parts in elevation, taken along line V—V of Figure 4.

Figure 6 is a side elevation view with parts broken and parts in section, showing the shock absorber mounted on a vehicle.

Figure 7 is an end view of the assembly shown in Figure 6 with parts broken and parts in section.

Figure 8 is a rear side view of the casing shown in Figure 6, with parts in section, to show passages extending between ports in the casing wall.

As shown in the drawings:—

A casing 10, defines a cylinder 11 in which a pair of main pistons, 12 and 13, are connected by a pair of piston rods 14, for reciprocation in the cylinder. Each end of the cylinder is closed by a head 15 which is threaded therein. Between the main piston 12 and the adjacent head of the cylinder there is an auxiliary piston 16 which is permitted limited movement inwardly by a chain 17 fastened to the piston by a threaded bolt 18 and to the cylinder head by a threaded bolt 19. The outward face of the auxiliary piston 16 has a dished portion 20, and the inner face of the adjacent cylinder head has a corresponding dished portion 21 so that space is provided to receive the chain 17 as the piston 16 approaches the head 15 on its outward movement. Between the main piston 13 and the head 15 adjacent to it there is an auxiliary piston 22, which is permitted limited movement by means similar to that described in connection with piston 16, and, for convenience, similar numerals have been given to parts similar to those already mentioned.

The main piston 12 has a slotted boss 23, and a link 25 is pivoted at one end between the jaws of the boss on a pin 24. The link 25 is pivotally connected at its other end to a bifurcated arm 26, by means of a pin 27, and the arm 26 is secured to a shaft 28 which is journalled in an offset integral hood portion 29 of the casing 10.

As shown in Figures 6 and 7 the casing may be mounted, lying horizontally, on the frame channel 30 of a vehicle, with the shaft 28 connected to an axle 31, of the vehicle, through a connecting rod 32, and a lever 33 which is connected on the outer end of the shaft. The hood portion 29 of the casing 10 is open at one side so that the several bearings may be readily lubricated and inspected, and the opening is normally closed by a plate 34 which is secured to the casing by means of bolts or other suitable means.

It will be obvious that relative movement of the axle 31 and the frame channel 30 will bring about reciprocation of the main pistons through the agency of the connecting means just described.

In Figure 1 all of the pistons are shown in their initial position. In this position the main pistons, with the cylinder wall, define a space 35, between them. Main piston 12 and auxiliary piston 16 define a compression chamber 36, between them, and the auxiliary piston 16 and the cylinder head define another compression space 37. At the other end of the cylinder there is a compression chamber 38 defined by the main piston 13 and the auxiliary piston 22, and another compression chamber 39 defined by the cylinder head and the auxiliary piston 22.

The space 35 is vented to atmosphere through a port 40 in the wall of the casing 10.

The space 36 is in communication with the space 39 through a port 41, a passage 42 formed in the wall of the casing, and a port 43 entering the casing at the other end. The end of the casing is enlarged to accommodate an inwardly seating spring-pressed check valve 44, which is adjusted to permit air to pass from space 39 to space 36 when the air pressure in the former reaches a predetermined value.

In a similar manner, the space 38 is in communication with space 37 through a port 45, a passage 46, and a port 47, controlled by an inwardly seating spring-pressed check valve 48 which is also adjusted to permit air to pass from space 37 to space 38 when the air pressure in the former reaches a predetermined value. The check valves 44 and 48 may be provided with a stop pin 49 or other equivalent means to limit the outward movement of the valve, and thus control the freedom with which air may escape through these relief valves, and at the same time encourage reseating of the valves when the air pressure has fallen to a desired value.

The main piston 12 and the auxiliary piston 16 are each provided with a port normally closed by inwardly seating spring-held mushroom valves 50 and 51, respectively, and the main piston 13 and the auxiliary piston 22 are also each provided with a port normally closed by spring-held inwardly seating mushroom valves 52 and 53, respectively.

It will now be clear that as main piston 12 is moved outwardly for a slight distance due to a slight movement of the frame and axle of the vehicle as it passes over a slight irregularity in the surface of the roadway, this piston will compress the air in space 36. Because of the inertia of piston 16 retarding its movement the increased air pressure in space 36 opens the valve 51 to pass air into space 37. How much air passes into space 37 and how readily it passes through the port controlled by valve 51 will depend upon the pre-existing pressure in space 37. It also follows that the pressure in space 37 will oppose outward movement of piston 16, and encourage opening of valve 51. The valve 51 acts as a relief valve to permit air to pass from space 36 to space 37, so that when the automobile is travelling on a smooth road and jolts are not severe and are infrequent, piston 12 has practically spaces 36 and 37 as one compression chamber, and it can advance relatively freely, and allow the springs of the vehicle to function normally. However, should the shocks be frequent the increased pressure in space 37 of the air pumped into it by piston 12 will result in the shocks being met by the compression of air in space 36 alone. It will be obvious that when piston 12 is retreating on the recoil stroke and pushing air ahead of it in space 35 and at the same time reducing the air pressure in space 36, then air may pass from space 35 to space 36 through valve 50 to take care of the deficiency caused when the piston pumped air into space 37.

While piston 12 advances it is obvious that the trailing piston 13 is reducing the air pressure in space 38 and that air will be admitted to this space through valve 52.

The recoil of the vehicle is checked by the advance of piston 13 against the air admitted into and trapped in space 38, and also by the fact that some of the air compressed by piston 12 on its advancing stroke is held trapped in space 37 and its energy is not available to hasten recoil.

If the vehicle is travelling at a very moderate speed or the roadway is good the springs of the vehicle are permitted to function normally when the wheels of the vehicle enter a depression or ride over a hump, but the recoil in each case is checked by the air cushions. When the shocks are frequent then the shock absorber practically supports the vehicle on air cushions.

As shown in Figures 3 and 4 should a fairly large relative, and sudden, movement of the frame and axle of the vehicle take place, the advancing piston 12 builds up enough pressure in space 36 to push piston 16 towards the end of the cylinder. The air pressure in space 37 will, naturally, also tend to increase, but when it has reached a predetermined value then relief valve 48 opens to allow air to pass to space 38. This air, and its energy, is now available to check the recoil of the vehicle by opposing the movement of piston 13. As piston 13 advances the air transferred from space 37 to space 38 will also find its way past valve 53 into space 39 so that its pressure decreases to not unduly limit the recoil. If the recoil is severe, in other words, if the stored energy of the moving vehicle is large, the advancing piston 13 will build up enough pressure at its end of the cylinder to cause relief valve 44 to open, and air will be transferred to space 37 to push piston 16 inwardly against the air in space 36.

As the air passes through the several ports and passages, and is compressed in the cylinder, much of its energy will be lost by friction, and by the conduction of its heat to the atmosphere by the casing.

It will now be clear that the shock absorber described takes care of the recoil in the event of moderate road shocks by trapping some of the compressed air so that its energy is not available to encourage recoil, and by compressing air on the recoil stroke. When moderate and infrequent road shocks are to be met, and air may have leaked from the several compression spaces so that the air therein is substantially at atmospheric pressure, the shock absorber is enabled to take care of the recoil by aspirating and pumping air so that air is compressed by one of the pistons on the recoil stroke.

When severe road shocks are experienced, air containing stored energy is transferred from a compression chamber at one end of the device to a compression chamber at its other end so that it is made available to check rather than to hasten recoil. This same air is also compressed on the recoil stroke; and it is transferred repeatedly from one to the other end of the cylinder, if necessary, to absorb the energy of the road shock.

The pistons may be provided with piston rings 54, to ensure a fairly tight fit in the bore of the cylinder, but since the main pistons are capable of replenishing the compression chambers with air to take care of leakage, tight fitting of the pistons and piston rings is not of prime importance, and the shock absorber is not materially lessened in efficiency of operation by a slight wear of the sliding surfaces.

If it is assumed that in the discussion of the operation of the device the advancing of piston 12 is caused by the coming together of the frame and axle of the vehicle as the wheel rides over a hump on the road it will be understood then that the advancing of piston 13 on its initial compression stroke will be caused by the wheel entering a depression or rut.

As shown in Figure 2, the effect of the spring 49 on either of the ball valves 44 and 48, before mentioned, may be readily varied by turning a plug 57 threaded in the outer end of the valve housing. A set screw 58, or other suitable means, is arranged engaging the plug 57 to lock it in position.

By varying the effect of the springs 49 on the ball valves 44 and 48 the shock absorber may be readily adjusted for service on light or heavy vehicles. When used on certain types of vehicles the pressure of the air in chambers 37 and 39 may be maintained at about 60 pounds. If the pressure due to the movement of the pistons materially exceeds this predetermined working value, then as may be understood upon referring to Figure 4, air forced from, say, chamber 37, is transferred to chamber 38, through valve 53 into chamber 39, out through valve 44 through passage 42, and finally to atmosphere through ports 41 and 40, now in communication with each other in chamber 35. As piston 12 retreats communication between ports 41 and 40 is cut off by the piston passing port 41. However, communication is also stopped by the closing of check valve 44 when the pressure in chamber 39 falls to the desired working value.

The air lost by escaping to atmosphere is replaced by movement of the main pistons in the manner already described.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A pneumatic shock absorber comprising a cylinder having closed ends, a pair of spaced connected main pistons reciprocable in the cylinder, auxiliary pistons positioned and reciprocable in said cylinder between said main pistons and the ends of the cylinder, the said main and auxiliary pistons being ported and having valve means thereon controlling said ports, chain means arranged limiting movement in one direction of said auxiliary pistons, the cylinder being ported intermediate said main pistons, conduit means forming a fluid connection between ports in said cylinder adjacent the ends thereof and compression chambers defined by each of said main pistons and adjacent auxiliary piston when the said pistons are in their normal position of rest, pressure-relief valves controlling said conduits, and driving means connected to said pistons.

2. A pneumatic shock absorber comprising a cylinder having closed ends, a pair of connected spaced main pistons reciprocable in said cylinder, auxiliary pistons reciprocable in said cylinder between each main piston and an adjacent end of the cylinder respectively, conduit means connecting a compression chamber defined by an auxiliary piston and an adjacent cylinder end with another compression chamber defined by a main piston and another auxiliary piston, and relief valve means controlling said conduit.

3. A pneumatic shock absorber comprising a cylinder having closed ends, a pair of spaced connected main pistons reciprocable in said cylinder, auxiliary pistons reciprocably positioned in said cylinder between each main piston and an adjacent cylinder end to define a compression chamber between each main piston and an auxiliary piston and another compression chamber between each auxiliary piston and an adjacent cylinder end, means arranged to limit movement of said auxiliary pistons, said auxiliary pistons having recesses formed therein adapted to receive said limiting means, conduits connecting the compression chambers defined between an auxiliary piston and a cylinder end with the compression chamber defined between a main and another auxiliary piston, and relief valve means controlling said conduit.

4. A pneumatic shock absorber comprising a cylinder closed at both ends, a pair of spaced connected pistons reciprocable in said cylinder, means including said pistons defining a plurality of high pressure chambers adjacent each end of the cylinder, means including said pistons defining a low pressure chamber between said pistons, conduit means connecting said low pressure chamber with the atmosphere, valved controlled conduit means selectively connecting said low pressure chamber with said high pressure chambers, means connecting certain of said high pressure chambers for fluid communication in one direction, and pressure relief valve means controlling said fluid communication means to permit the flow of air between said high pressure chambers only after a predetermined pressure has been attained.

5. A shock absorber, comprising a cylinder closed at both ends, means defining high and low pressure chambers in said cylinder, reciprocable pressure members in said cylinder, means in said pressure members arranged to selectively control the flow of air from the low pressure chamber to the high pressure chambers upon movement of said pressure members, and means arranged to selectively permit the transfer of air from one high pressure chamber to another high pressure chamber when a predetermined air pressure has been attained in one of said chambers.

6. A pneumatic shock absorber comprising a casing defining a cylinder closed at both ends, spaced connected compression members reciprocable in said cylinder and defining therein high pressure chambers of variable volumetric capacity, and a low pressure chamber of constant volumetric capacity, the said low pressure chamber being vented to atmosphere, conduit means connecting said high pressure chambers for fluid communication therebetween, relief valve means controlling said conduits, and means including a compression member and relief valve means arranged to place said high pressure chambers in communication with said low pressure chamber upon a predetermined movement of said compression members coincident with the existence of a pressure in said high pressure chambers above a predetermined value.

7. A pneumatic shock absorber comprising a cylinder, reciprocable compression members therein arranged defining a low pressure chamber of constant volumetric capacity and a plurality of high pressure chambers of variable volumetric capacity, the said low pressure chamber being vented to atmosphere, conduit means connecting said high pressure chambers in fluid communication, valve means controlling said conduits, and means including compression members and relief valve means arranged to selectively connect said high pressure chambers with said low pressure chamber.

8. In a pneumatic shock absorber, a cylinder, a piston reciprocable in said cylinder to compress air therein, means defining a chamber in the cylinder to receive air compressed by said piston as it advances towards an end of the cylinder and to entrap said air as said piston retreats, another piston in the cylinder connected to said first named piston, means arranged to admit air behind said last named piston as said first named piston advances to compress air, said last named piston being arranged to compress air to retard movement of said first piston as it retreats.

9. In a pneumatic shock absorber, a cylinder, compression members reciprocable in said cylinder defining a low pressure chamber of constant volumetric capacity and a plurality of high pressure chambers of variable volumetric capacity, said low pressure chamber being vented to atmosphere, means including compression members arranged to selectively pump air from said low pressure chamber to a high pressure chamber to be entrapped therein, and means including pressure members selectively connecting said high pressure chambers with said low pressure chamber to release air from said high pressure chambers when a predetermined pressure has been attained therein.

10. A pneumatic shock absorber including a cylinder, spaced main piston means defining a low pressure chamber of constant volumetric capacity, said chamber being normally vented to atmosphere, auxiliary piston means reciprocable in the cylinder defining high pressure chambers of variable volumetric capacity, and means including said main piston means arranged to selectively place said high pressure chambers in fluid communication with said low pressure chamber to relieve the air pressure in said high pressure chambers.

11. In a pneumatic shock absorber, a cylinder, a main piston reciprocable in said cylinder to compress air therein, means including a floating piston defining a chamber in said cylinder to receive air compressed by said main piston as it advances toward an end of the cylinder and to entrap said air as said main piston retreats, and valve controlled conduit means connecting said chamber with the space behind said main piston for flow of compressed air through said space after the pressure in said chamber has attained a predetermined volume whereby the retreat of said main piston will be retarded.

12. In a pneumatic shock absorber, a cylinder, a main piston reciprocable in said cylinder to compress air therein, a floating piston defining with the cylinder ends a compression chamber in which air is compressed by movement of said floating piston in response to air pressure caused by advance movement of said main piston toward the cylinder ends, and a valve controlled passage from said compression chamber to the cylinder space behind said main piston for conducting air under pressure from said pressure chamber to said space after the pressure in said chamber has reached a predetermined volume and whereby the retreat movement of said main piston will be retarded.

13. In a pneumatic shock absorber, a cylinder, a main piston reciprocable in said cylinder to compress air therein, a floating piston defining with the cylinder ends a compression chamber in which air is compressed by movement of said floating piston in response to air pressure caused by advance movement of said main piston toward the cylinder ends, and a valve controlled passage from said compression chamber to the cylinder space behind said main piston for conducting air under pressure from said pressure chamber to said space after the pressure in said chamber has reached a predetermined volume and whereby the retreat movement of said main piston will be retarded and means whereby said space behind the piston will be vented to atmosphere after a predetermined retreat movement of said main piston.

In testimony whereof I have hereunto subscribed my name at Chicago, Cook County, Illinois.

PETER W. KANE.